INVENTOR
JASPER BLACKBURN
BY Edward E. Lingan
ATTY.

June 9, 1931.  J. BLACKBURN  1,809,543
DEVICE FOR PREVENTING THE ROTATION OF CABLES IN HANGER SEATS
Filed June 6, 1927  2 Sheets-Sheet 2
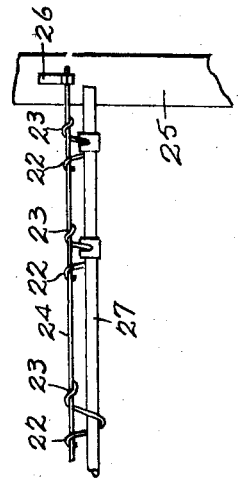
Fig. 6
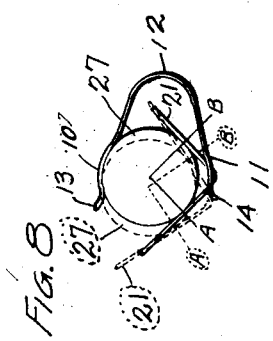
Fig. 8
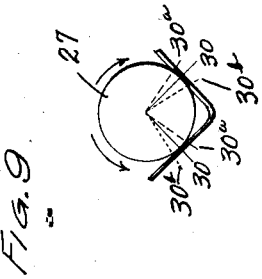
Fig. 9
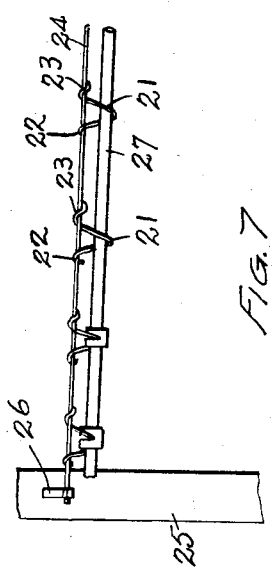
Fig. 7
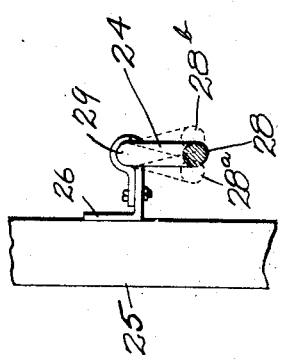
INVENTOR
JASPER BLACKBURN
By Edward E. Longan
ATTY.

Patented June 9, 1931

1,809,543

UNITED STATES PATENT OFFICE

JASPER BLACKBURN, OF WEBSTER GROVES, MISSOURI

DEVICE FOR PREVENTING THE ROTATION OF CABLES IN HANGER SEATS

Application filed June 6, 1927. Serial No. 196,990.

My invention relates to improvements in devices for preventing the rotation of cables in hanger seats, and has for its object a device which can be readily snapped around a cable and be in contact with a cable hanger whereby rotation of the cable in the hanger seat is prevented and thereby the wearing through of the sheath or lead coat of the cable eliminated.

I have discovered that the swaying of cables together with messenger wires supporting such cables causes a rotary movement of both messenger wire and the cable to each side of the posts to which the messenger wire is secured. This is due to the fact that at that point the messenger wire has absolutely no movement, this movement gradually increasing until midway between the poles it is greatest. In addition to this swaying a sort of pendulum movement is obtained by reason of the fact that the heavy lead cable causes the messenger wire to sag between the posts. This swaying however, as before stated, grows less and less as it approaches the pole on either side of the center of the span of the messenger wire and on account of the wire being clamped or rather held in a clamp which is attached to the pole, no swaying movement can take place there but it acts as a pivot so that only a twisting motion is applied at that point. This also prevents the cable hanger from swaying and consequently the cable supported in the hanger twists back and forth thus wearing through the sheath.

By the use of my improved device the cable is securely clamped and held in the cable seat of the hanger so that it can not turn and thus a slight swinging movement will be imparted to the hangers on either side of the supporting poles approximately equal to the twist in the messenger wire. It is true that this may cause a wearing action on the hooks of the hangers but it is much easier and cheaper to replace the hangers when the hooks become worn thin than to cut out and splice in a new piece of cable.

In the drawings:

Fig. 6 is a fragmental view on a reduced scale showing a cable and messenger wire in their proper relation with my devices in position;

Fig. 7 is an enlarged view illustrating diagrammatically the swing of the messenger wire;

Fig. 8 is a diagrammatic view of a cable supported in a cable seat with my device applied showing how the rotation of the cable in the cable seat is prevented; and Fig. 9 is a diagrammatic view of a cable supported in the cable seat showing the manner in which the cable rotates when my device is omitted.

Figure 1:
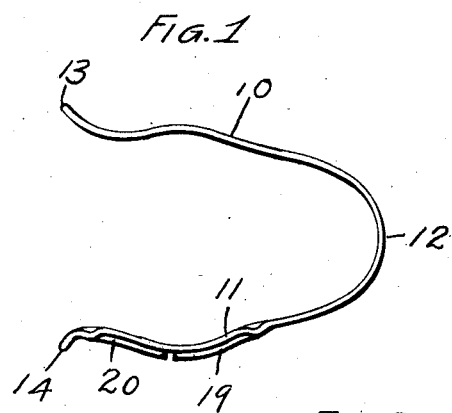
Fig. 1 is a side elevation of my device.
Figure 2:
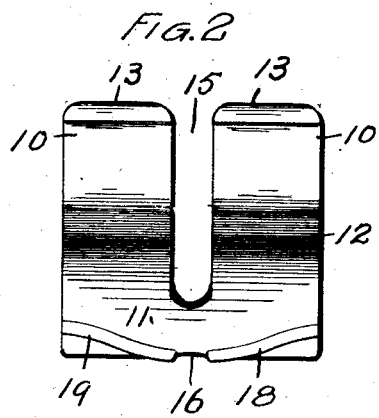
Fig. 2 is a rear view of the same.
Figure 3:
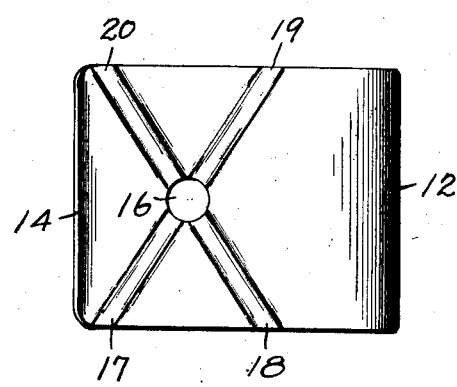
Fig. 3 is a bottom plan view illustrating the formation of one of the jaws so that it can be used either for a single ring hanger or for a hanger having a cradle seat.
Figure 4:
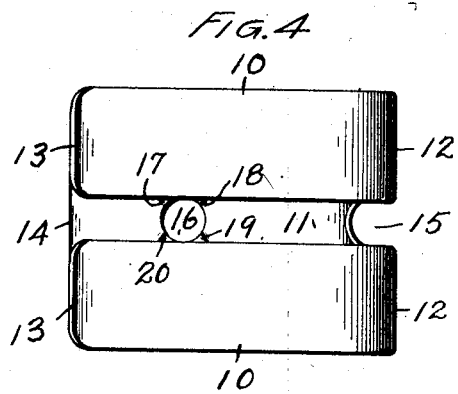
Fig. 4 is a top plan view of my device.
Figure 5:
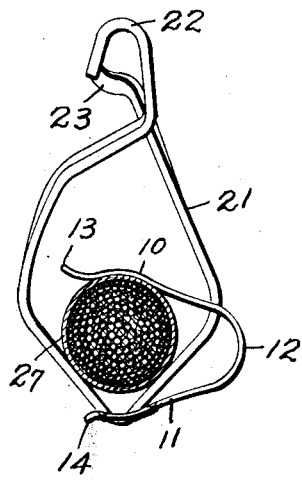
Fig. 5 is a side elevation of a hanger with a cable shown in section therein and my device in position.

In carrying out my device I employ a U shaped member having jaws 10 and 11. These jaws are united by an integrally formed bend 12, the entire device being constructed of spring material. The ends 13 and 14 of the jaws 10 and 11 respectively are bent outward as illustrated in Fig. 1 so as to permit their more ready sliding into position. The jaw 10 is provided with a slot 15 which is for use when a single ring cable hanger is employed, this slot permitting one arm of the hanger to enter so that the jaw 10 can straddle the arm. The jaw 11 is preferably provided with an opening 16, which is directly below the slot 15. The jaw 11 also is preferably provided with diagonally extending grooves 17, 18, 19 and 20. These grooves run from the side edges of the member 11 to the opening 16 and are so arranged that certain of them will receive portions of a cable hanger when a cradle or sinuous cable seat is employed. 21 represents a single ring cable hanger of the type commonly employed in supporting cables and is provided with hooks 22 and 23, which pass over a messenger wire 24. As the manner of applying these hooks is well understood and forms no part of my invention, it will not be described in detail. Neither will the cable supports or rings be described in detail as my device can be applied to any of the existing types.

25 represents the poles to which the messenger wire 24 is secured by means of brackets 26. 27 represents the cable which is suspended from the messenger wire by means of the hangers or rings 21. It will be noted from Fig. 6 that the central portion, that is the portion between the poles 25 sags, this sag gradually increasing from each pole till it reaches a point midway between the poles where the sag is greatest. The messenger wire 24 is tightly held in the brackets 26 so that no movement of the wire in the brackets is possible.

It will be observed from Fig. 7 that the portion marked 28, which represents the messenger wire at its point of greatest sag, is some distance below the point marked 29, which represents the messenger wire at the point where it is supported by the bracket. The sway of the messenger wire is indicated by 28a and 28b, these two points being on opposite sides of the point 28 and illustrate the sway of the wire. From this it will be seen that the point 28 moves from side to side of a plane extending vertically through the point 29 and in order to do this and by reason of the fact that the point 29 is held immovable, a certain amount of twisting must take place in the messenger wire at the point 29, this twisting action gradually growing less as the distance from the clamps 26 increases thereby permitting the messenger wire to commence to sway slightly after a certain distance from the clamp has been reached. The cable rings or supports being held on the messenger wire by a gripping action follow the movement of the messenger wire to a great extent and consequently those adjacent the clamps 26 have very little movement and permit very little movement of the cable 27. This cable also swaying will produce a rotating movement of the cable in the hangers adjacent the poles 25 and by being only loosely supported in the seat of the hanger, the cables can turn therein which will wear the lead sheath around the electric wires in the cable entirely through causing the hanger to contact with certain of the conductors in the cable and short-circuit them. When this occurs that piece of the cable will have to be cut out and a new piece spliced in—a very expensive operation.

The twisting of the cable in the seat is diagrammatically shown in Fig. 9 in which 30 represents the contact points of the cable with the cable seat of the hanger when the cable is at rest, that is not swaying. 30a and 30b show the various positions which this contact point will assume when the cable rotates. In other words, the twisting or rotation of the cable in the cable seat causes a sliding movement of the sheath of the cable in the seat, that is that part of the sheath between the lines 30a and 30b.

By the use of my device however this is eliminated as illustrated in Fig. 8 in which the device is applied to the cable and hanger securely binding the cable to the seat so that when any rotation of the cable occurs, this rotation will be imparted to the hanger causing it to sway slightly and in so doing have a pendulum-like movement on the messenger wire but preventing all movement between the cable and the cable seat of the hanger and consequently eliminating the wearing through or cutting of the sheath of the cable.

It will be noted from the foregoing description that the jaw 10 is bifurcated by reason of having the slot 15 formed therein and also that the jaws 10 and 11 are provided with an outwardly bowed portion, which will fit the contour of the cable. It will also be observed that the opening 16 not alone permits a portion of the single ring hanger to pass therethrough but acts as a drain so that in the event of rain any water accumulated in the lower portion of the hanger can readily pass therefrom and prevent rusting. Furthermore this opening will permit a portion of the cable hanger when a V seat is employed to pass therethrough thus forming an additional hold for my device, and again when a cradle seat is used, any moisture accumulating in the lower portion of my device will travel toward this opening and drip out so that at no time will a pocket be formed for the retention of moisture or rain.

It is also obvious that in the forming of my device I may provide grooves which extend at different angles to the grooves already specified but an important feature is that any of the grooves, no matter at what angle formed, will cross each other or concentrate at a point which will be occupied by the opening 16.

Having fully described my invention, what I claim is:—

1. A device for preventing the rotation of cables in hanger seats comprising a U shaped member formed of spring material and having one of its jaws bifurcated, its other jaw having an opening therethrough, said other jaw being also provided with grooves extending from said opening across its face.

2. A device for preventing the rotation of cables in hanger seats comprising a U shaped member formed of spring material and having a bifurcated jaw adapted to receive one arm of a cable hanger suspended from a messenger wire, the ends of said U shaped member being bent outwardly, said member adapted to simultaneously engage with said cable hanger and having a cable carried thereby so as to prevent rotation of said cable in said hanger.

In testimony whereof I have affixed my signature.

JASPER BLACKBURN.